US010996545B2

(12) United States Patent
Zhuo et al.

(10) Patent No.: US 10,996,545 B2
(45) Date of Patent: May 4, 2021

(54) APERTURE SWITCHING DEVICE, CAMERA DEVICE AND ELECTRONIC APPARATUS

(71) Applicant: New Shicoh Motor Co., Ltd., Zhejiang (CN)

(72) Inventors: Yingji Zhuo, Zhejiang (CN); Hua Wei, Zhejiang (CN); Wei Sun, Zhejiang (CN); Juhe Zhou, Zhejiang (CN)

(73) Assignee: NEW SHICOH MOTOR CO., LTD, Zhejiang (CN)

(*) Notice: Subject to any disclaimer, the term of this patent is extended or adjusted under 35 U.S.C. 154(b) by 0 days.

(21) Appl. No.: 16/791,676

(22) Filed: Feb. 14, 2020

(65) Prior Publication Data

US 2020/0264495 A1 Aug. 20, 2020

(30) Foreign Application Priority Data

Feb. 18, 2019 (CN) ......................... 201910123466.3

(51) Int. Cl.
*G03B 17/12* (2021.01)
*G03B 17/56* (2021.01)
*G03B 9/06* (2021.01)

(52) U.S. Cl.
CPC ............... *G03B 17/12* (2013.01); *G03B 9/06* (2013.01); *G03B 17/566* (2013.01)

(58) Field of Classification Search
None
See application file for complete search history.

(56) References Cited

U.S. PATENT DOCUMENTS 4,963,916 A * 10/1990 Tanaka ..................... G03B 9/08 396/235
5,008,699 A * 4/1991 Tominaga ............. G03B 7/087 396/165
5,150,702 A * 9/1992 Miyanaga .......... A61B 1/00096 348/362

(Continued)

FOREIGN PATENT DOCUMENTS

JP 2000056355 A 2/2000
JP 2005134438 A 5/2005
JP 2017201382 A 11/2017

OTHER PUBLICATIONS

Office Action for Korean Patent Application No. 10-2020-0019027, dated Mar. 11, 2021.

*Primary Examiner* — William B Perkey
(74) *Attorney, Agent, or Firm* — Hayes Soloway PC

(57) ABSTRACT

An aperture switching device is described that includes a base, a casing fitted to cover the base, and clamping parts fixed to the base. The clamping parts are driving power source input terminals and a shape memory alloy wire with two ends electrically connects the clamping parts. The base has a first light transmission hole, a rotary connecting part, a sliding groove, and a position regulating part. The casing has a second light transmission hole that corresponds to the first light transmission hole. A movable bump is connected to the shape memory alloy wire and slidably disposed within the sliding groove. An elastic member is disposed between the position regulating part and the movable bump. An optical aperture switching unit is positioned with one end portion mounted on the rotary connecting part and the end portion includes a switching slot mounted on the movable bump.

10 Claims, 5 Drawing Sheets

21 20 71 711 712 A 70 721 72 A 722 30 60 30 50 40 11 10 15 12 13 16 14

(56) References Cited

U.S. PATENT DOCUMENTS

| | | | | |
|---|---|---|---|---|
| 5,185,621 | A * | 2/1993 | Kagechika | G02B 7/08 396/248 |
| 5,459,544 | A * | 10/1995 | Emura | G03B 9/00 396/257 |
| 6,516,146 | B1 * | 2/2003 | Kosaka | F03G 7/065 148/402 |
| 6,554,501 | B2 * | 4/2003 | Kosaka | G03B 9/08 396/452 |
| 7,628,554 | B2 * | 12/2009 | Wernersson | G03B 9/04 348/367 |
| 7,976,230 | B2 * | 7/2011 | Ryynanen | G03B 11/043 396/463 |
| 2007/0242949 | A1 * | 10/2007 | Ryynanen | G03B 11/043 396/463 |
| 2008/0050112 | A1 * | 2/2008 | Wernersson | G03B 9/06 396/463 |
| 2011/0314742 | A1 * | 12/2011 | Hsu | G03B 9/36 49/358 |
| 2019/0121219 | A1 * | 4/2019 | Hwang | G03B 11/043 |
| 2020/0026149 | A1 * | 1/2020 | Jun | G03B 9/02 |
| 2020/0264495 | A1 * | 8/2020 | Zhuo | G03B 9/06 |
| 2020/0292915 | A1 * | 9/2020 | Kazuo | G06F 1/1626 |

* cited by examiner

APERTURE SWITCHING DEVICE, CAMERA DEVICE AND ELECTRONIC APPARATUS

CROSS-REFERENCE TO RELATED APPLICATION AND PRIORITY

This patent application claims priority from Chinese Patent Application No. 201910123466.3 filed Feb. 18, 2019. The patent application is herein incorporated by reference in its entirety.

TECHNICAL FIELD

The present disclosure relates to the field of electronic apparatus, and in particular to an aperture switching device, and a camera device and an electronic apparatus including the same.

BACKGROUND

With the increasing popularity of portable electronic apparatus such as smartphones and tablet computers, these electronic apparatus may include a camera function, for example, a voice coil motor type mobile phone camera module aperture switcher is a relatively common type.

However, the driving structure in the voice coil motor type mobile phone camera module aperture switcher is complex, and the volume of the product is not easy to be reduced. The aperture switcher structure needs to be integrated with the camera motor structure, and it cannot be a separate functional component to be selected and assembled in a matching manner for different modules. The electromagnetic component of the switcher easily generates electromagnetic interference with the camera voice coil motor.

In view of this, those skilled in the art urgently need to improve the structure of the aperture switching device in order to solve the above technical problems.

The technical problems to be solved by the present disclosure are to overcome the defects that the conventional aperture switcher structure is complex and the volume is not easy to be reduced. And an object of the present disclosure is to provide an aperture switching device, a camera device and an electronic apparatus having a simple structure and capable of being easily miniaturized.

SUMMARY

The present disclosure solves the above technical problems by the following technical solutions.

According to a first aspect of the present disclosure, an aperture switching device is provided. The aperture switching device includes: a base having a first light transmission hole provided corresponding to an aperture, a rotary connecting part, a sliding groove and a position regulating part; a casing fitted to cover the base; clamping parts fixed on the base as driving power source input terminals; a shape memory alloy wire having two ends respectively electrically connected to the clamping parts; a movable bump connected to the shape memory alloy wire and slidably disposed in the sliding groove; an elastic member disposed between the position regulating part and the movable bump; and an optical aperture switching unit having one end portion mounted on the rotary connecting part, wherein the end portion is provided with a switching slot and the switching slot is mounted on the movable bump.

According to a second aspect of the present disclosure, a camera device is provided. The camera device includes the aperture switching device as described above.

According to a third aspect of the present disclosure, an electronic apparatus is provided. The electronic apparatus includes the camera device as described above.

The positive effects of the present disclosure are as follows.

The driving unit used in the present disclosure is configured by a single shape memory alloy wire and a driving power source input terminal, and forms an adjustable aperture switching device independently mountable on the lens of the camera module, wherein the motion converting unit thereof is composed of a movable bump and a sliding groove, and the optical aperture switching unit thereof is composed of a plurality of light-shielding sheets and includes a plurality of optical aperture openings of different sizes.

The movable bump guides a slot provided in the optical aperture switching unit to switch the relative combination relationship of the light-shielding sheets and change the size of the aperture opening. A motion recovery device is composed of an elastic element, and provides a positional reset of the motion mechanism and the optical aperture switching unit.

The supporting base is provided with an optical opening and accommodates the above unit. This outer cover is provided with an optical opening and engages the supporting base to provide sealing and protection to the device.

DESCRIPTION OF THE DRAWINGS

The above and other features, properties and advantages of the present disclosure will become more apparent from the description in conjunction with the accompanying drawings and Examples. The same reference numerals in the drawings always indicate the same features.

DETAILED DESCRIPTION

Figure 1:
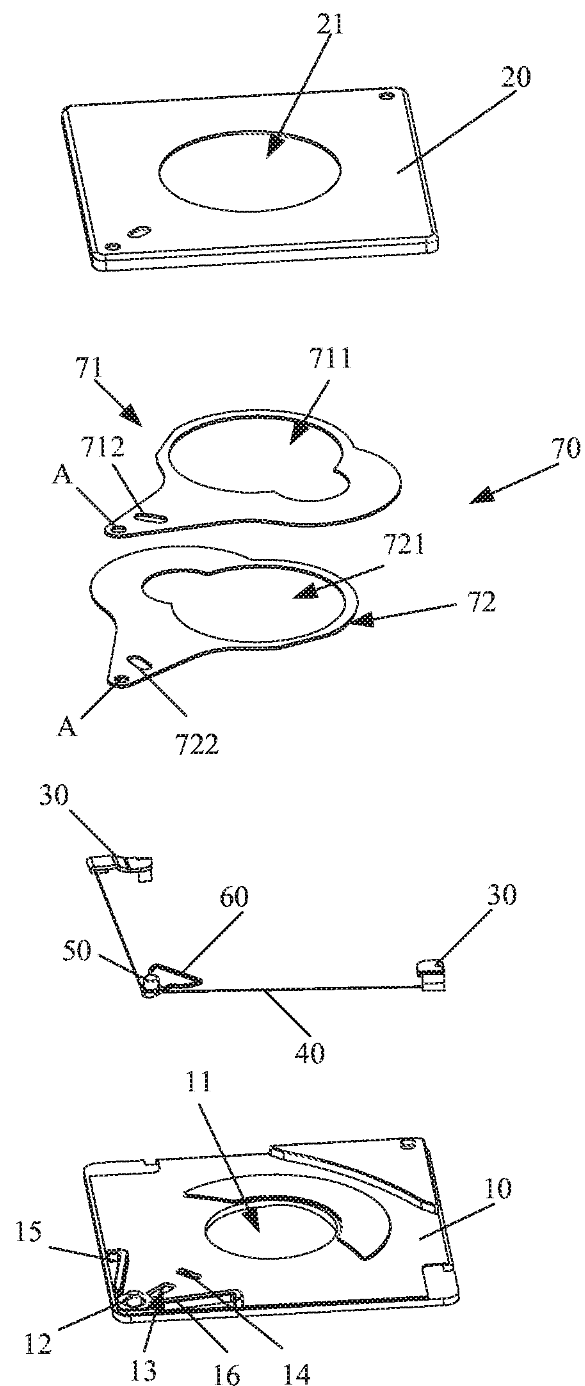
FIG. 1 is an exploded view of an aperture switching device of the present disclosure.

In order to make the above-described objects, features and advantages of the present disclosure more apparent and obvious, the specific embodiments of the present disclosure will be described in detail below with reference to the accompanying drawings.

Examples of the present disclosure will now be described in detail with reference to the accompanying drawings. Reference will now be made in detail to the preferred Examples of the present disclosure, and examples of which are illustrated in the accompanying drawings. Wherever possible, the same reference numerals in the drawings will be used to refer to the same or like parts.

Further, although the terms used in the present disclosure are selected from well-known common terms, some of the terms mentioned in the specification of the present disclosure may be selected by the applicant according to his or her judgment, and the detailed meaning thereof is explained in the relevant part of the description herein.

Furthermore, it is intended that the present disclosure shall be understood not only by the actual terms used, but also by the meaning implied in each term.

Figure 2:
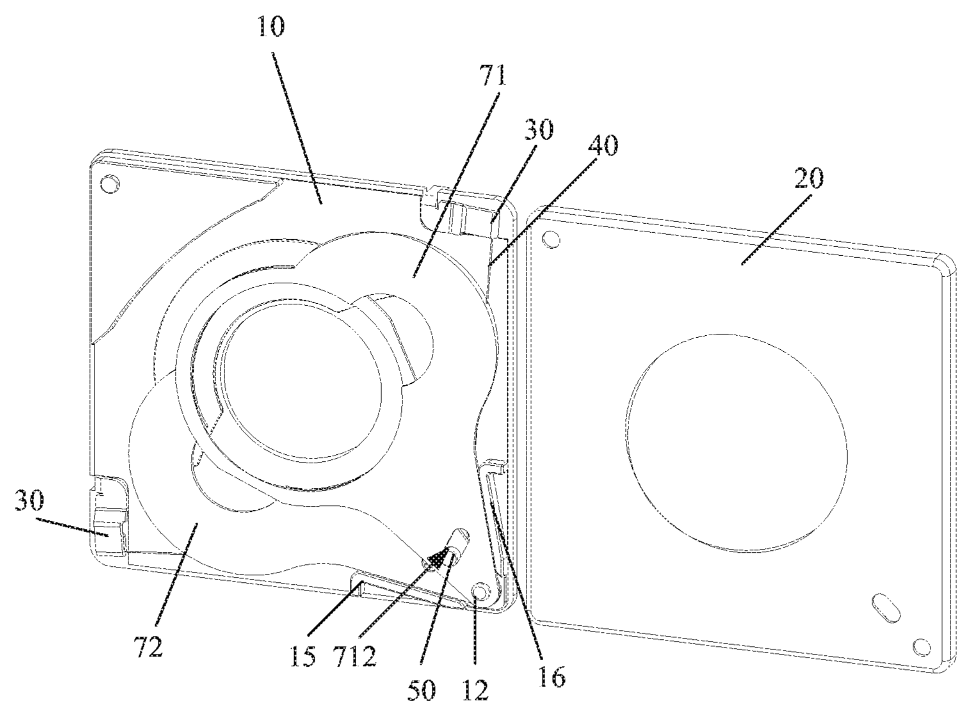
FIG. 2 is a schematic diagram showing a state in which the casing is opened in the aperture switching device of the present disclosure.
Figure 3:
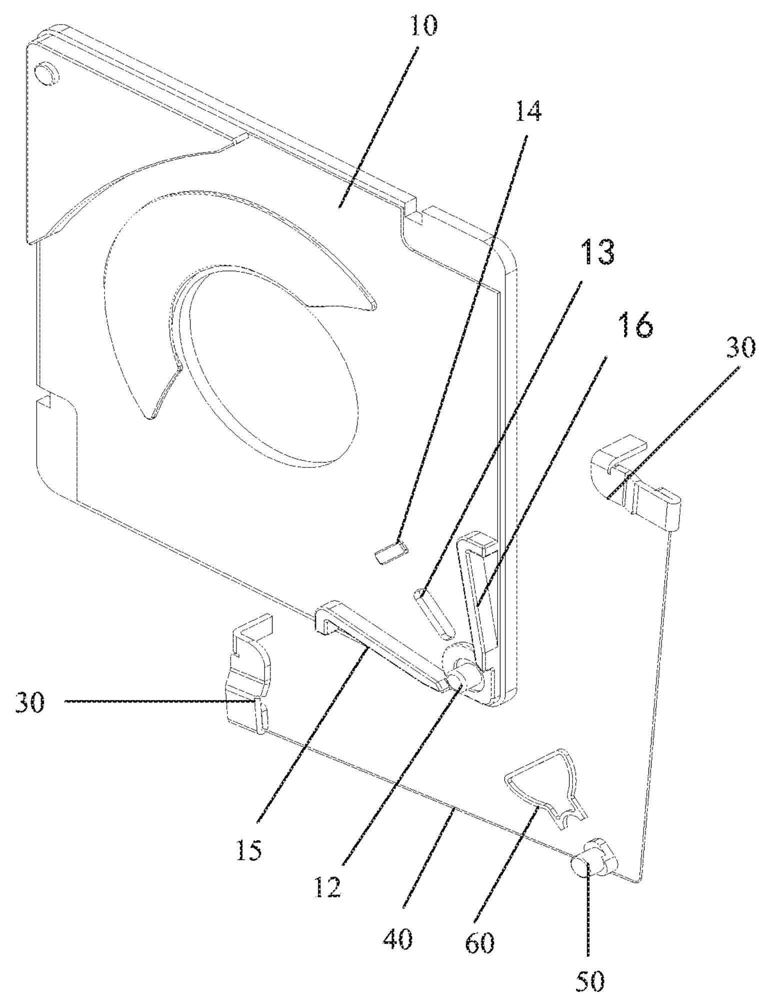
FIG. 3 is an exploded schematic diagram showing an internal structure of the aperture switching device of the present disclosure.
Figure 4:
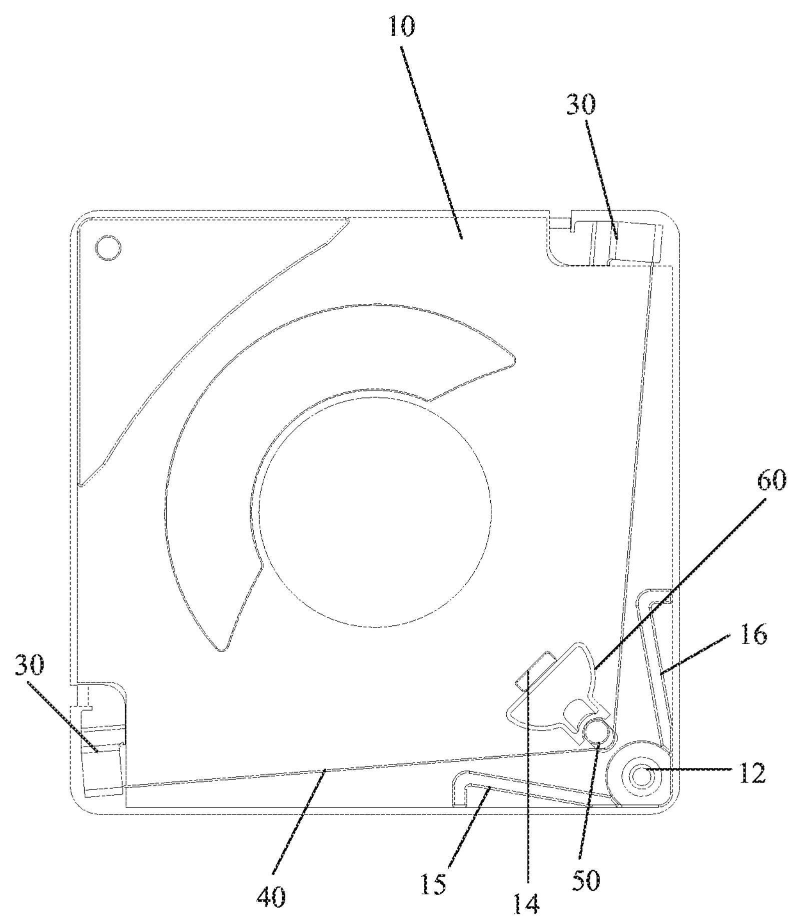
FIG. 4 is a schematic diagram showing the overall structure of the internal structure of the aperture switching device of the present disclosure.
Figure 5:
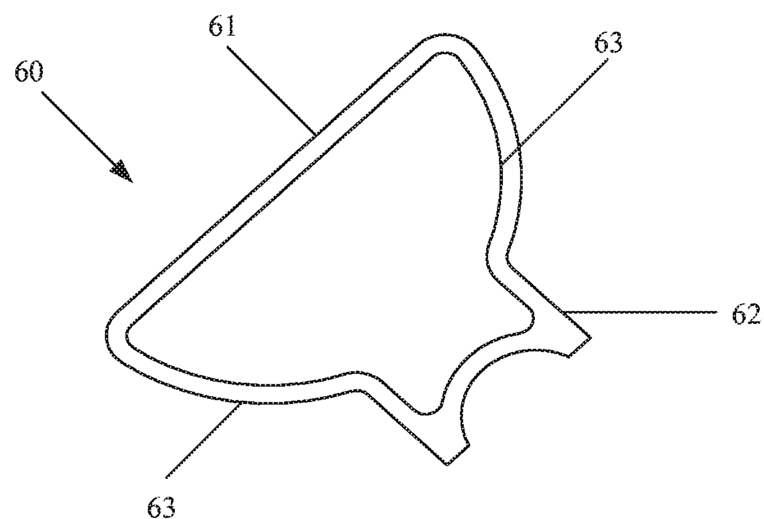
FIG. 5 is a structural schematic diagram showing an elastic member in the aperture switching device of the present disclosure.
Figure 6:
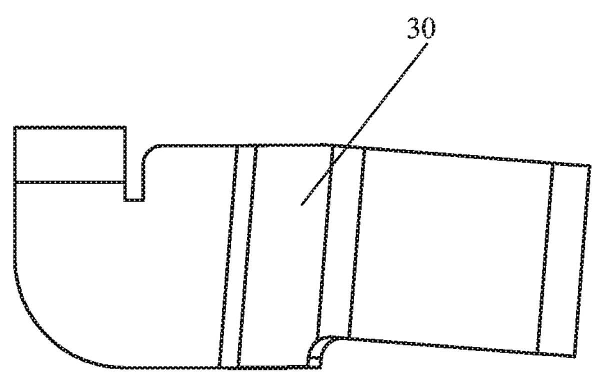
FIG. 6 is a structural schematic diagram showing the clamping part in the aperture switching device of the present disclosure.

FIG. 1 is an exploded view of an aperture switching device of the present disclosure. FIG. 2 is a schematic diagram showing a state in which the casing of the aperture switching device of the present disclosure is opened. FIG. 3 is an exploded schematic diagram showing an internal structure of the aperture switching device of the present disclosure. FIG. 4 is a schematic diagram showing the overall structure of the internal structure of the aperture switching device of the present disclosure. FIG. 5 is a structural schematic diagram showing an elastic member in the aperture switching device of the present disclosure. FIG. 6 is a structural schematic diagram showing the clamping part in the aperture switching device of the present disclosure.

As shown in FIG. 1 to FIG. 6, the present disclosure discloses an aperture switching device including a square base 10 and a square casing 20, wherein a first light transmission hole 11 is opened in the base 10 corresponding to an aperture, a second light transmission hole 21 is provided in the casing 20 corresponding to the aperture, and the casing 20 is fitted to cover the base 10. The base 10 is provided with a rotary connecting part 12 and a sliding groove 13. The aperture switching device further includes: clamping parts 30, a shape memory alloy wire 40, a movable bump 50, an elastic member 60 and an optical aperture switching unit 70.

The clamping parts 30 (for example, two clamping parts 30 are used in the present Example, but, of course, the number of the clamping parts 30 is not limited and it is merely an example here) mainly function as driving power source input terminals and are fixed to the base 10. Here, the clamping parts 30 are preferably conductive terminals.

Two ends of the shape memory alloy wire 40 are respectively connected to the corresponding clamping parts 30. The movable bump 50 is connected to the shape memory alloy wire 40 and slidably disposed in the sliding groove 13. The elastic member 60 is fixed to the rotary connecting part 12 and abuts against the movable bump 50. One end portion of the optical aperture switching unit 70 is mounted on the rotary connecting part 12, and the end portion is provided with a switching slot, the switching slot is mounted on the movable bump 50.

Thus, when current flows into the shape memory alloy wire 40 through the clamping parts 30, the shape memory alloy wire 40 contracts, and the moved movable bump 50 moves in the sliding groove 13 toward the first light transmission hole 11 while overcoming the elastic force of the elastic member 60; and the movable bump 50 drives the switching slot to move, thereby controlling the optical aperture switching unit to change the overlapping shape and achieve the effect of changing the aperture.

Preferably, the optical aperture switching unit 70 includes a first movable part 71 and a second movable part 72. A third light transmission hole 711 is provided in the first movable part 71. A fourth light transmission hole 721 is provided in the second movable part 72. The third light transmission hole 711 and the fourth light transmission hole 721 each have a shape formed by two circles having different sizes and decentered from each other, and an aperture is formed by the overlap of the third light transmission hole 711 and the fourth light transmission hole 721. The first movable part 71 and the second movable part 72 are overlapped, and when the first movable part 71 and the second movable part 72 are rotated relative to each other, the size of the aperture is adjusted by changing the overlap position of the third light transmission hole 711 and the fourth light transmission hole 721.

Further, each of the first movable part 71 and the second movable part 72 is provided with a mounting hole A and is mounted on the rotary connecting part 12 through the mounting hole A. The switching slot includes a first switching slot 712 and a second switching slot 722, wherein the first switching slot 712 is provided in the first movable part 71, and the second switching slot 722 is provided in the second movable part 72. The first switching slot 712 and the second switching slot 722 are formed so as to be obliquely line-symmetrical to each other with the sliding groove 13 as a center and intersect and overlap with each other to be mounted movable bump 50 when the first movable part 71 and the second movable part 72 are mounted on the base 10.

Furthermore, the base 10 is provided with a position regulating part 14, a first stopper 15 and a second stopper 16, and the first stopper 15, the second stopper 16 and the position regulating part 14 surround the sliding groove 13. One end of the elastic member 60 abuts against or is fixed to the position regulating part 14, and the other end of the elastic member 60 abuts against or is fixed to the movable bump 50. The first movable part 71 and the second movable part 72 are rotated between the first stopper 15 and the second stopper 16 so as to limit the rotation angle between the first movable part 71 and second movable part 72 and adjust the size of the aperture.

Specifically, as shown in FIG. 4, in the present Example, the two clamping parts 30 are respectively mounted at the two opposite corners of the base 10. The rotary connecting part 12 is disposed at one corner of the base 10, and the rotary connecting part 12 is located between the clamping parts 30. The sliding groove 13 is formed vertically obliquely above the rotary connecting part 12 and the position regulating part 14 is provided obliquely above the sliding groove 13. The first stopper 15 is disposed on the left side of the rotary connecting part 12 and located at one side edge of the base 10. The second stopper 16 is disposed on the right side of the rotary connecting part 12 and located at the other side edge adjacent to the above-mentioned one side edge of the base 10.

Two ends of the shape memory metal wire 40 are respectively connected to the two clamping parts 30, and the shape memory metal wire 40 is stretched by pressing and connected to the movable bump 50 to form a shape of L. That is, the movable bump 50 is connected to the intersecting portion of the L shape, and the rotary connecting part 12 and the sliding groove 13 are provided at the corner portion of the base 10 corresponding to the intersecting portion of the L shape. Thereby, the shape memory metal wire 40 is located on the inner sides of the first stopper 15 and the second stopper 16. As the shape memory metal wire 40 is driven to be elongated or shortened, the movable bump 50 can be slid in the sliding groove 13, thereby rotating the first movable part 71 and the second movable part 72.

Preferably, the elastic member 60 includes a position-limiting part 61 and an engaging part 62. The position-limiting part 61 and the engaging part 62 are connected by the elastic parts 63 such that the position-limiting part 61 abuts against or is fixed to the position regulating part 14 and the engaging part 62 is engaged with the movable bump 50. Preferably, the connection shape of the position-limiting part 61 and the elastic parts 63 is substantially a shape of letter D, and the shape of the engaging part 62 is substantially a shape of letter M. The engaging part 62 has an action of pushing and engaging, and the action of elastic member 60 generates driving force and restoring force.

According to the above description on the structure, the aperture switching device of the present disclosure can be divided into a driving unit, a motion converting unit, an optical aperture switching unit, a motion recovery unit, a base, and an outer casing as a whole. The driving unit is configured by a single shape memory alloy wire 40 and a clamping part 30 as a driving power source input terminal. Since there is no electromagnetic interference with the voice coil motor of the camera, it is possible to form an adjustable aperture switching device independently mountable on the lens of the camera module.

The motion converting unit is composed of a movable bump 50 and a sliding groove 13, and the optical aperture switching unit 70 is composed of a plurality of light-shielding sheets (i.e., the first movable part 71, the second movable part 72, and the like) and a plurality of optical aperture openings of different sizes are formed in the light-shielding sheets. The movable bump 50 guides a switching slot provided in the optical aperture switching unit to switch the relative combination relationship of the light-shielding sheets and change the size of the light entrance g aperture.

A motion recovery unit is composed of an elastic member 60 and realizes a positional reset of the motion converting unit and the optical aperture switching unit.

The supporting base (i.e., the base 10 in the present Example) is provided with a first light transmission hole 11 as an optical opening and accommodates each of the above units. This outer cover (i.e., the casing 20 in the present Example) is provided with a second light transmission hole 21 as an optical aperture and is jointed with the supporting base (base 10) to seal and protect the entire device.

When electric power is fed to the shape memory metal wire 40, the shape memory alloy wire 40 contracts, the movable bump 50 is driven to slide in the sliding groove 13, and the first switching groove 712 and the second switching groove 722 are slid. Thus, the first movable part 71 and the second movable part 72 relatively rotate around the rotary connecting part 12 penetrating two mounting holes A, thereby adjusting the overlapping portion between the third light transmission hole 711 and the fourth light transmission hole 721 and realizing the adjustment of the size of the aperture.

Based on the above structure, the present disclosure further provides a camera device provided with an aperture switching device as described above.

Based on the above structure, the present disclosure further provides an electronic apparatus provided with a camera device as described above.

The positive effects of the present disclosure are as follows.

According to the aperture switching device of the present disclosure, the shape memory alloy wire drives the movable bump to move, thereby the optical aperture switching unit moves, and the size of the aperture can be switched. Therefore, the structure is simple and the miniaturization can be easily realized. Further, a single shape memory alloy wire and a clamping part as a driving power source input terminal constitute a driving unit. Since there is no electromagnetic interference with the voice coil motor of the camera, an adjustable aperture switching device independently mountable on the lens of the camera module can be formed.

The motion converting unit is composed of the movable bump and the sliding groove. The optical aperture switching unit is composed of a plurality of light-shielding sheets formed with a plurality of optical aperture openings of different sizes. The movable bump guides a switching slot provided in the optical aperture switching unit to switch the relative combination relationship of the light-shielding sheets and change the size of the light entrance aperture. Further, an elastic member constitutes the motion recovery unit and realizes the positional reset of the motion converting unit and the optical aperture switching unit.

The base as a supporting base is formed with a first light transmission hole serving as an optical opening and accommodates each of the above units. The casing as an outer cover is formed with a second light transmission hole serving as an optical opening and engages with the supporting base to seal and protect the entire device.

In summary, the aperture switching device according to the embodiment of the present disclosure can be independently mounted on the lens of the camera module by driving using the shape memory metal wire, and can adjust the amount of light entrance the imaging system by changing the size of the light entrance aperture to the lens. Therefore, the aperture switching device according to the embodiment has a simple structure and can be easily miniaturized.

While the specific embodiments of the present disclosure have been described above, those skilled in the art will appreciate that these are merely illustrative, and the protection scope of the present disclosure is defined by the appended claims. Those skilled in the art can make various changes or modifications to these embodiments without departing from the principles and spirit of the present disclosure, and such changes and modifications fall within the protection scope of the present disclosure.

What is claimed is:

1. An aperture switching device comprising:

a base comprising a first light transmission hole, a rotary connecting part, a sliding groove and a position regulating part, the first light transmission hole being provided corresponding to an aperture;

a casing comprising a second light transmission hole provided corresponding to the aperture and being fitted to cover the base;

clamping parts fixed on the base as driving power source input terminals;

a shape memory alloy wire with two ends respectively electrically connected to the corresponding clamping parts;

a movable bump connected to the shape memory alloy wire and slidably disposed in the sliding groove;

an elastic member disposed between the position regulating part and the movable bump; and an optical aperture switching unit with one end portion mounted on the rotary connecting part, wherein the end portion is provided with a switching slot and the switching slot is mounted on the movable bump.

2. The aperture switching device according to claim 1, wherein the optical aperture switching unit comprises a first movable part and a second movable part, and a third light transmission hole is provided in the first movable part;

a fourth light transmission hole is provided in the second movable part; and the first movable part and the second movable part are overlapped, and when the first movable part and the second movable part are rotated relative to each other, the third light transmission hole and the fourth light transmission hole adjust the size of the aperture.

3. The aperture switching device according to claim 2, wherein each of the first movable part and the second movable part is provided with a mounting hole and is mounted on the rotary connecting part through the mounting hole.

4. The aperture switching device according to claim 2, wherein the switching slot comprises a first switching slot and a second switching slot, the first switching slot is provided in the first movable part, and the second switching slot is provided in the second movable part, and the first switching slot and the second switching slot are overlapped with each other and mounted on the movable bump.

5. The aperture switching device according to claim 2, wherein the base is further provided with a first position-limiting blocking part and a second stopper, and the first position-limiting blocking part, the second stopper and the position regulating part surround the sliding groove;

one end of the elastic member abuts against or is fixed to the position regulating part, and the other end of the elastic member abuts against or is fixed to the movable bump; and the first movable part and the second movable part are rotated between the first stopper and the second stopper.

6. The aperture switching device according to claim 5, wherein the elastic member comprises a position-limiting part and an engaging part, the position-limiting part and the engaging part are connected by the elastic parts, the position-limiting part abuts against or is fixed to the position regulating part, and the engaging part is engaged with the movable bump.

7. The aperture switching device according to claim 6, wherein a shape where the position-limiting part and the elastic parts are connected is substantially a shape of letter D, and the shape of the engaging part is substantially a shape of letter M.

8. A camera device comprising the aperture switching device according to claim 1.

9. An electronic apparatus comprising the camera device according to claim 8.

10. The aperture switching device according to claim 3, wherein:

the switching slot comprises a first switching slot and a second switching slot, the first switching slot is provided in the first movable part, and the second switching slot is provided in the second movable part, and the first switching slot and the second switching slot are overlapped with each other and mounted on the movable bump.

* * * * *